United States Patent [19]

Westeppe et al.

[11] Patent Number: 5,128,437

[45] Date of Patent: Jul. 7, 1992

[54] POLYCARBONATE FROM BI(TETRAHYDROFURAN)DI PHENOL

[75] Inventors: Uwe Westeppe, Mettmann; Hans-Josef Buysch, Krefeld; Ulrich Grigo, Kempen; Klaus Berg, Krefeld, all of Fed. Rep. of Germany

[73] Assignee: Bayer Aktiengesellschaft, Leverkusen, Fed. Rep. of Germany

[21] Appl. No.: 596,800

[22] Filed: Oct. 12, 1990

[30] Foreign Application Priority Data

Oct. 18, 1989 [DE] Fed. Rep. of Germany ....... 3934712

[51] Int. Cl.$^5$ .............................................. C08G 64/04
[52] U.S. Cl. .................................... 528/201; 528/196; 528/204
[58] Field of Search ......................... 528/201, 204, 196

[56] References Cited

U.S. PATENT DOCUMENTS 4,506,066  3/1985  Medem et al. ...................... 528/196
4,982,014  1/1991  Freitag et al. ...................... 568/721

FOREIGN PATENT DOCUMENTS 314007  5/1989  European Pat. Off. .
3804988  8/1989  Fed. Rep. of Germany .

OTHER PUBLICATIONS

Journal of American Chemical Society, vol. 63, 580–581, 1941.
Rec. Trav. Chim, vol. 87, 1968, pp. 599–608.

*Primary Examiner*—Harold D. Anderson
*Attorney, Agent, or Firm*—Joseph C. Gil; Aron Preis

[57] ABSTRACT

The invention relates to the use of the diphenol corresponding to formula (I)

for the production of high molecular weight, thermoplastic, aromataic polycarbonates, to a process for the production of these polycarbonates and to the new thermoplastic having improved heat resistance obtainable by the process.

4 Claims, No Drawings

POLYCARBONATE FROM BI(TETRAHYDROFURAN)DI PHENOL

This invention relates to the use of the diphenol corresponding to formula (I)

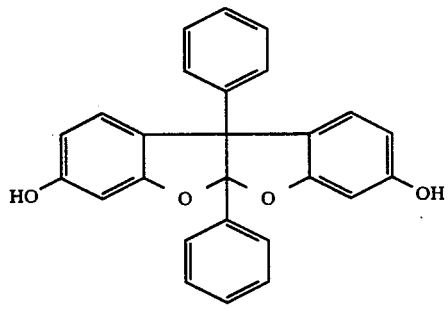

for the production of high molecular weight, thermoplastic, aromatic polycarbonates.

The dihydroxy compound corresponding to formula (I) is known (cf. J. Am. Chem. Soc. 63, 580 (1941) (where the structure is incorrectly assigned), Rec. Trav. Chim. 87, 599 (1968) DE-OS 3 804 988 and EP 0 314 007); is prepared by condensation of benzil with resorcinol in the presence of acidic catalysts (sulfuric acid, acidic cation exchanger resins).

It has now surprisingly been found that the dihydroxy compound (I) is particularly suitable for the production of high molecular weight, thermoplastic polycarbonates which are distinguished by high heat resistance in combination with other favorable properties.

The diphenol corresponding to formula (I) may be used for the production of high molecular weight, thermoplastic, aromatic polycarbonates either on its own, in which case homopolycarbonates are formed, or in admixture with other diphenols, for example those corresponding to the formula

Suitable other diphenols corresponding to the formula

are those in which Z is an aromatic radical containing 6 to 30 C atoms which may contain one or more aromatic nuclei, may be substituted and may contain aliphatic radicals or cycloaliphatic radicals or other heterocyclic radicals than those corresponding to formula (I) or heteroatoms as bridge members.

Examples of diphenols corresponding to formula (II) are hydroquinone, resorcinol, dihydroxydiphenyls, bis-hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, $\alpha,\alpha'$-bis-(hydroxyphenyl)-diisopropylbenzenes and ring-alkylated and ring-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846, in DE-OSS 1 570 703, 2 063 050, 2 063 052 and 2 211 0956, in German Patent Application P3832 396.6 (Le A 26344), in FR-PS 1 561 518 and in the book by H. Schnell entitled "Chemistry and physics of Polycarbonates" Interscience Publishers, N.Y., 1964.

Preferred other diphenols are, for example, 4,4,-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, $\alpha,\alpha'$-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred other diphenols corresponding to formula (II) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane, 1,1,-bis-(4-hydroxyphenyl)-3,3,5-trimethyl cyclohexane.

2,2-Bis-(4-hydroxyphenyl)-propane is particularly preferred.

The other diphenols may be used both individually and in admixture with one another.

The molar ratio of the diphenols of formula (I) to be used in accordance with the invention to the other diphenols optionally used, for example those corresponding to formula (II), should be between 100 mol-% (I) to 0 mol-% other diphenol and 3 mol-% (I) to 97 mol-% other diphenol, preferably between 100 mol-% (I) to 0 mol-% other diphenol and 7 mol-% (I) to 93 mol-% other diphenol and, more preferably, between 100 mol-% (I) to 0 mol-% other diphenol and 15 mol-% (I) to 85 mol-% other diphenol and, most preferably, between 100 mol-% (I) to 0 mol-% other diphenol and 20 mol-% (I) to 80 mol-% other diphenol.

The high molecular weight polycarbonates of the diphenol of formula (I) according to the invention, optionally in combination with other diphenols, may be prepared by any of the known methods used to produce polycarbonates. The various diphenols may be attached to one another both statistically and also in blocks.

Accordingly, the present invention also relates to a process for the production of high molecular weight, thermoplastic, aromatic polycarbonates from diphenols, optionally chain terminators and optionally branching agents by known methods for the production of polycarbonates, preferably by the two-phase interfacial method, characterized in that the diphenol corresponding to formula (I) in quantities of 100 mol-% to 3 mol-%, preferably in quantities of 100 mol-% to 7 mol-%, more preferably in quantities of 100 mol-% to 15 mol-% and most preferably in quantities of 100 mol-% to 20 mol-%, based in each case on the total molar quantity of diphenols used, and optionally other diphenols in quantities complementary to 100 mol-%, based on the total quantity of diphenols, are used as the diphenols.

Small quantities, preferably quantities of 0.05 to 2.0 mol-% (based on mols diphenols used), of trifunctional or more than trifunctional compounds, particularly those containing three or more phenolic hydroxyl groups serve in known manner as branching agents, where necessary, to obtain branched polycarbonates. Branching agents containing three or more phenolic hydroxyl groups, which may be used in accordance with the invention, include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5,-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds may be used in the usual concentrations as chain terminators for regulating molecular weight in known manner. Suitable compounds are, for example, phenol, tert.-butylphenols or other alkyl-$C_1$-$C_7$-substituted phenols. Small quantities of phenols corresponding to formula (III)

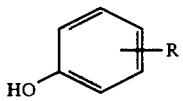

(III)

in which R is a branched $C_8$ and/or $C_9$ alkyl radical, are particularly suitable for regulating molecular weight.

In the alkyl radical R, the percentage of $CH_3$ protons is between 47 and 89% and the percentage of CH and $CH_2$ protons between 53 and 11%. R is preferably in the o-and/or p-position to the OH group, 20% being the particularly preferred upper limit to the ortho component. The chain terminators are generally used in quantities of from 0.5 to 10 mol-% and preferably in quantities of from 1.5 to 8 mol-%, based on mols diphenols used.

The polycarbonates may be produced in known manner, preferably by the interfacial process (cf. H. Schnell "Chemistry and Physics of Polycarbonates", Polymer Reviews, Vol. IX, pages 33 et sec, Interscience Publ., 1964). In this process, the diphenol corresponding to formula (I) is dissolved in aqueous alkaline phase. The quantity of alkali is preferably selected so that the aqueous phase has a pH value of 8 to 10.5 and preferably 9 to 10. After addition of the organic solvent, the diphenol is reacted with a carbonate donor (phosgene). Towards the end of the addition of the phosgene, a pH value of >11 is adjusted.

To prepare copolycarbonates with other diphenols, mixtures of diphenols corresponding to formula (I) and the other diphenols, for example those corresponding to formula (II), are used.

Chain terminators, for example corresponding to formula (III), may be added to regulate molecular weight.

As already mentioned, the reaction with phosgene is then carried out by the interfacial condensation method in the presence of an inert, preferably polycarbonate-dissolving, organic phase. The reaction temperature is in the range from 0° to 40° C.

The branching agents optionally used (preferably 0.05 to 2 mol-%) may either be initially introduced with the diphenols in the aqueous alkaline phase or may be added in solution in the organic solvent before the phosgenation.

In addition to the diphenols of formula (I) and the other diphenols (II), mono- and/or bis-chlorocarbonic acid esters thereof may also be used, being added in solution in organic solvents. The quantity of chain terminators and branching agents used is then determined by the molar quantity of diphenolate structural units corresponding to formula (I) and, optionally, of the other diphenols, for example corresponding to formula (II). Where chlorocarbonic acid esters are used, the quantity of phosgene may be reduced accordingly in known manner.

Suitable organic solvents for the solution of the chain terminators and, optionally, for the branching agents and the chlorocarbonic acid esters are, for example, methylene chloride, chlorobenzene, acetone, acetonitrile and mixtures of these solvents, particularly mixtures of methylene chloride and chlorobenzene. The chain terminators and branching agents used may optionally be dissolved in the same solvent.

The organic phase for the interfacial polycondensation may be formed, for example, by methylene chloride, chlorobenzene and by mixtures of methylene chloride and chlorobenzene.

Aqueous NaOH solution for example is used as the aqueous alkaline phase.

The production of the polycarbonates according to the invention by the interfacial process may be catalyzed in the usual way by such catalysts as tertiary amines, particularly tertiary aliphatic amines, such as tributylamine or triethylamine. The catalysts may be used in quantities of from 0.05 to 10 mol-%, based on mols diphenols used. The catalysts may be added before the beginning of phosgenation or during or even after phosgenation.

The polycarbonates according to the invention are isolated in known manner.

The polycarbonates may also be produced by the known homogeneous-phase process, the so-called "pyridine process" and also by the known melt transesterification process using diphenyl carbonate for example instead of phosgene. In this case, too, the polycarbonates are isolated in known manner.

The polycarbonates obtainable by the process according to the invention preferably have molecular weights $\overline{M}w$ (weight average, as determined by gel chromatography after preliminary calibration) of at least 10,000 and, more preferably, in the range from 12,000 to 250,000 and, most preferably, in the range from 20,000 to 100,000. They may be linear or branched and are homopolycarbonates or copolycarbonates based on the diphenol corresponding to formula (I).

Accordingly, the present invention also relates to linear or branched, high molecular weight, thermoplastic, aromatic polycarbonates having weight average molecular weights (Mw) of at least 10,000, preferably in the range from 12,000 to 250,000 and more preferably in the range from 20,000 to 100,000 obtainable by the process according to the invention.

Accordingly, the invention also relates to high molecular weight, thermoplastic, aromatic polycarbonates having weight average molecular weights (Mw) of at least 10,000, preferably in the range from 12,000 to 250,000 and more preferably in the range from 20,000 to 100,000 which contain bifunctional carbonate structural units corresponding to formula (Ia)

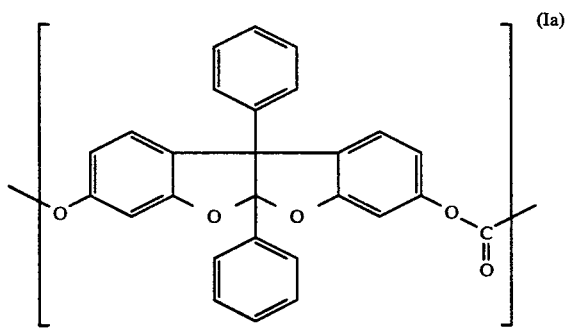

in quantities of from 100 mol-% to 3 mol-%, preferably in quantities of from 100 mol-% to 7 mol-%, more preferably in quantities of from 100 mol-% to 15 mol-% and, most preferably, in quantities of from 100 mol-% to 20 mol-%, based in each case on the total quantity of 100 mol-% of difunctional carbonate structural units in the polycarbonate.

Accordingly, the polycarbonates according to the invention contain quantities - complementary in each case to 100 mol-%—of other difunctional carbonate structural units, for example those corresponding to formula (IIa)

in which Z is an aromatic $C_{6-30}$ radical, i.e. in quantities of from 0 mol-% (inclusive) to 97 mol-% inclusive, preferably from 0 mol-% to 93 mol-%, more preferably from 0 mol-% to 85 mol-% and most preferably from 0 mol-% to 80 mol-%, based in each case on the total quantity of 100 mol-% of difunctional carbonate structural units in the polycarbonate according to the invention.

It has now surprisingly been found, as already mentioned, polycarbonates combining high heat resistance with other favorable properties are obtained by incorporation of the diphenol of formula (I) in accordance with the invention. In addition to high heat resistance, these polycarbonates based on the diphenol of formula (I) show good flow behavior, particularly considering their high heat resistance, good FR behavior and also high stability to hydrolysis and good thermal aging behavior, which had not been expected.

In addition, the properties of the polycarbonates may be favorably varied by combination of the diphenol (I) with other diphenols, particularly those corresponding to formula (II).

The polycarbonates obtainable by the process according to the invention are isolated in known manner by separating off the organic phase obtained in the interfacial process, washing it until it is neutral and free from electrolyte and then isolating the polycarbonate as granulate, for example using an evaporation extruder, or isolating the polycarbonate from a solution by precipitation.

Typical additives for thermoplastic polycarbonates, such as stabilizers, mold release agents, pigments, flame-proofing agents, antistatic agents, fillers and reinforcing materials, may be added to the polycarbonates according to the invention in the usual quantities before or after their processing.

More particularly, carbon black, kieselguhr, kaolin, clays, $CaF_2$, $CaCO_3$, aluminium oxides, graphite, glass fibers and organic and inorganic pigments, for example, may be added both as fillers and as nucleating agents while glycerol stearates, pentaerythritol tetrastearate and trimethyl propane tristearate, for example, may be added as mold release agents.

The polycarbonates according to the invention may be processed to moldings, for example by extruding the polycarbonates isolated in known manner to granulate and processing the granulate, optionally after addition of the additives mentioned above, to various articles in known manner by injection molding.

The polycarbonates according to the invention may be used as moldings for any of the applications typical of known polycarbonates, i.e. in the electrical field and in building construction for covering and glazing purposes, particularly in cases where high heat resistance has to be combined with good processability, i.e. where complicated structural elements of high resistance are required.

In the following Examples, relative viscosity is measured on a 0.5% by weight solution of the polycarbonate in $CH_2Cl_2$.

The glass temperature is measured by differential scanning calorimetry (DSC).

EXAMPLE 1

39.4 g (0.1 mol) of the diphenol of formula (I), 8.0 g (0.2 mol) NaOH and 300 g water are dissolved while stirring in an inert gas atmosphere. A solution of 0.188 g (2 mol-%) phenol in 400 ml methylene chloride is then added. 19.8 g (0.2 mol) phosgene were introduced into the thoroughly stirred solution at pH 10 and at 21° to 25° C., the pH value being kept between 9 and 10 by addition of 35.6 g 45% sodium hydroxide. The remaining sodium hydroxide is added after introduction of the phosgene. 5 Minutes after introduction of the phosgene, 0.7 ml ethyl pyridine is added, followed by stirring for 45 minutes. The bisphenolate-free aqueous phase is separated off, the organic phase is washed with water after acidification with phosphoric acid and is freed from the solvent. The polycarbonate has a relative solution viscosity of 1.145.

The glass temperature of the polymer was found to be 293° C. (DSC). Thermogravimetric analysis showed a weight loss of only 20% at 430° C.

EXAMPLE 2

18.3 g (0.08 mol) bisphenol A (2,2-bis-(4-hydroxyphenyl)-propane, 7.9 g (0.02 mol) diphenol (I), 8.0 g (0.2 mol) NaOH and 331 g water are dissolved with stirring in an inert gas atmosphere. A solution of 0.235 g phenol in 248 ml methylene chloride is then added. 19.8 g (0.2 mol) phosgene were introduced into the thoroughly stirred solution at 22 to 24° C., the pH value being kept between 9 and 10 by addition of 35.6 g 45% sodium hydroxide. The remaining sodium hydroxide is added after introduction of the phosgene. 0.7 ml ethyl piperidine is then added, followed by stirring for 45 minutes at pH 13. The bisphenolate-free aqueous phase is separated off, the organic phase is washed with water until neutral after acidification with phosphoric acid and is freed from the solvent. The polycarbonate has a relative solution viscosity of 1.343.

The glass temperature of the polymer was found to be 180° C. (DSC).

EXAMPLE 3

A mixture of 11.4 g (0.05 mol) bisphenol A and 19.7 g (0.05 mol) of the diphenol (I) was reacted as in Example 2 to form the polycarbonate.

The polycarbonate had a relative solution viscosity of 1.387.

The glass temperature of the polymer was found to be 233° C. (DSC).

EXAMPLE 4

A mixture of 6.8 g (0.03 mol) bisphenol A and 27.6 g (0.07 mol) of diphenol (I) was reacted as in Example 2 with addition of 426 g water and 320 ml methylene chloride to form the polycarbonate.

The polycarbonate had a relative solution viscosity of 1.395.

The glass temperature of the polymer was found to be 258° C. (DSC).

What is claimed is:

1. A polycarbonate prepared from (i) a carbonate donor (ii) at least one diphenol of the formula

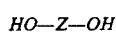

wherein Z denotes an aromatic radical having 6 to 30 carbon atoms and wherein about 3 to 100 mole percent of said diphenol correspond to a diphenol of the formula

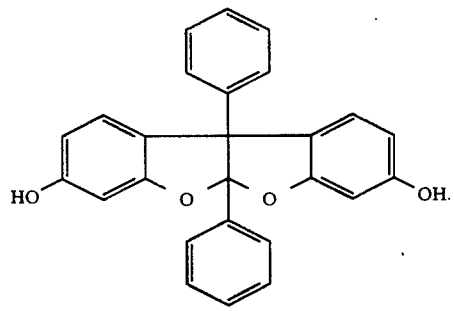

2. A high weight average molecular weight thermoplastic aromatic polycarbonate prepared by a process comprising dissolving a diphenol corresponding to

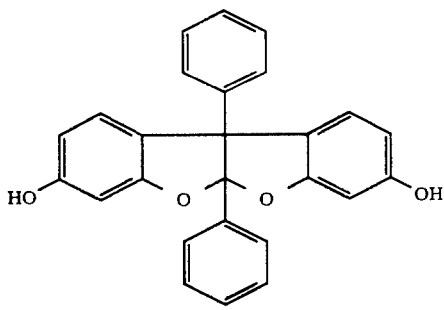

in an alkaline aqueous phase having a pH value of about 8 to 10.5, adding an organic solvent, reacting said diphenol with a carbonate donor, and towards the end of the addition of said carbonate donor, adjusting the pH value to a value greater than 11.

3. A high weight average molecular weight thermoplastic aromatic polycarbonate prepared by a process comprising dissolving a mixture of diphenols containing at least 3 mole percent, relative to the amount of said diphenols, of a diphenol corresponding to

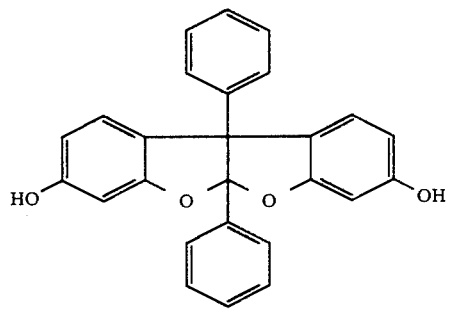

in an alkaline aqueous phase having a pH value of about 8 to 10.5, adding an organic solvent, reacting said diphenol with a carbonate donor, and towards the end of the addition of said carbonate donor, adjusting the pH value to a value greater than 11, said mixture containing diphenols corresponding to
wherein Z denotes an aromatic radical having 6 to 30 carbon atoms.

4. The polycarbonate of claim 2 wherein said weight average molecular weight is 12,000 to 250,000.

* * * * *